Dec. 19, 1933. E. V. TAYLOR 1,940,469
BRAKE
Filed Sept. 7, 1929 2 Sheets-Sheet 1

INVENTOR.
Eugene V. Taylor
BY H. O. Clayton
ATTORNEY

Patented Dec. 19, 1933

1,940,469

UNITED STATES PATENT OFFICE 1,940,469

BRAKE

Eugene V. Taylor, Chicago, Ill., assignor to Bendix Brake Company, South Bend, Ind., a corporation of Illinois Application September 7, 1929. Serial No. 390,869

11 Claims. (Cl. 188—152)

This invention relates to brakes and is illustrated as embodied in an internal expanding type of automotive brake.

With this type of brake it is one desideratum that the brake shoes or the friction elements be applied to the revolving brake drum with equal pressures. With the two-shoe type of symmetrical brake, each shoe being separately anchored and other things being equal, the application of equal forces to the ends of the shoe results in equal braking effect in either direction of drum rotation and also permits of interchangeability of the brakes on all four wheels.

It is also to be noted that if both shoes are simultaneously applied and one has a greater lining clearance than the other, if the applying forces are not balanced the shoe first contacting with the drum will receive the greater portion of power of the applying means. It is the object of my invention, therefore, to devise a simple, compact and withal effective applying means for the friction elements which distributes its forces to the respective friction elements in equal proportions.

With that end in view, there is preferably employed a hydraulic motor which may be secured to the backing plate or support for the brake either within or without the same, the reciprocating piston of the latter being arranged to actuate an equalizing bar, which bar in turn applies balanced forces through the medium of compression links to a plurality of wedging cams, the latter adapted to apply the friction elements to the revolving drum.

A further object of my invention is to produce a two-part lineally movable cam structure whose pressures are balanced by a reciprocable fluid operated power means.

The above and other objects and desirable features of the invention, including specific details of construction and combinations of parts, will become evident from the following detailed description of a preferred embodiment of my invention disclosed in the figures of the drawings, in which.

Figure 1:
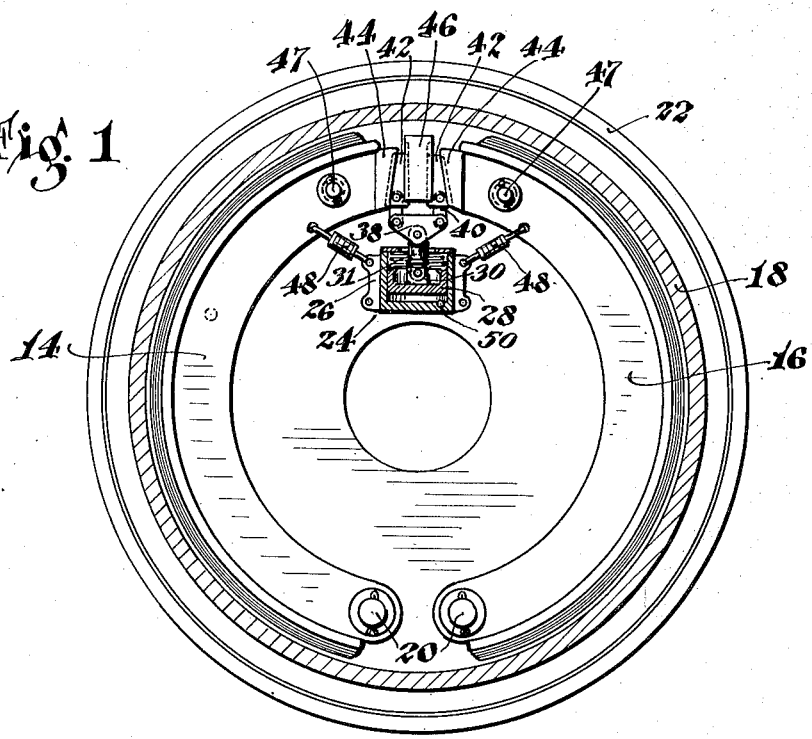
Figure 1 is a section taken through the brake drum of the wheel and showing the brake elements and novel operator in side elevation.
Figure 3:
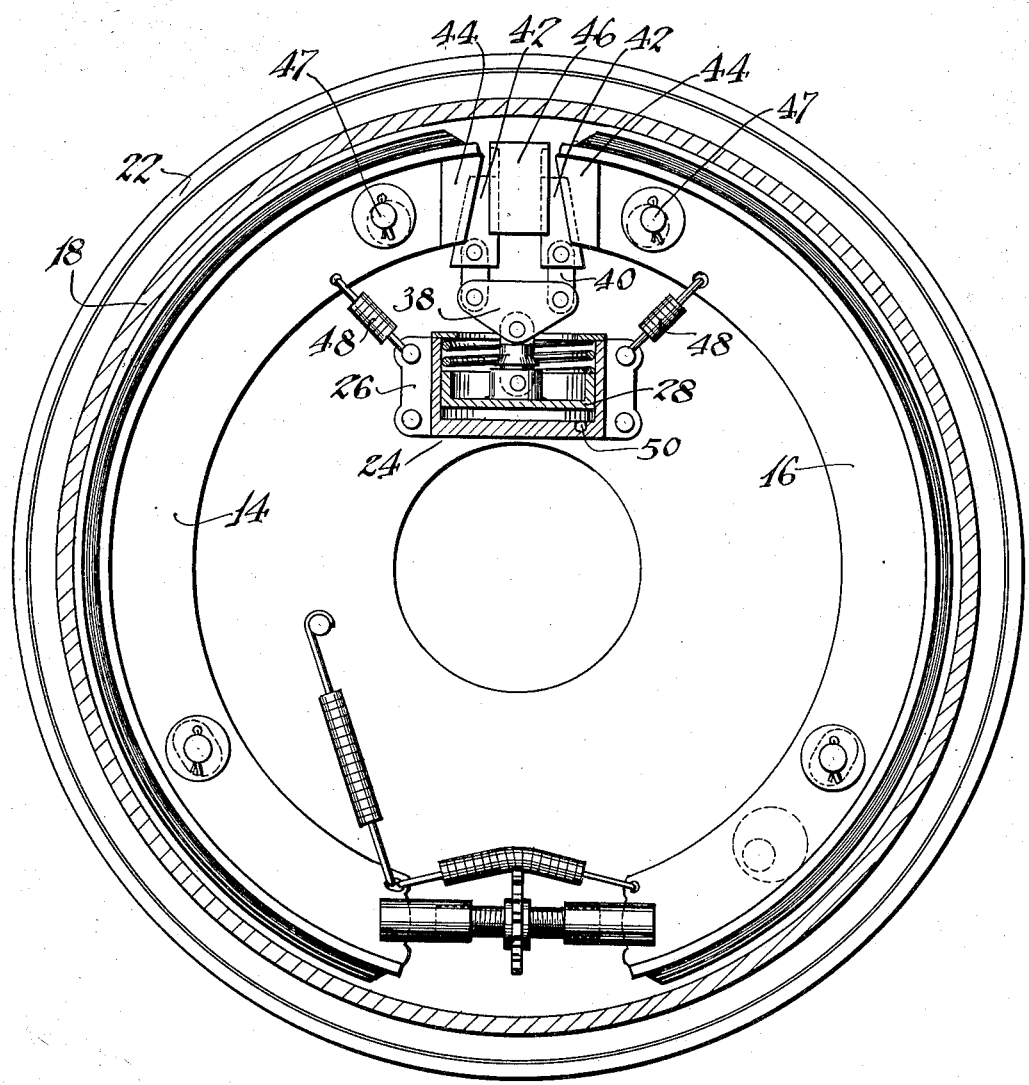
Figure 3 is a view similar to Fig. 1 showing a modification.

As illustrated in Figure 1, the friction elements 14 and 16 of an internal expanding type of brake are disclosed positioned within a rotatable brake drum 18 and secured to, through the intermediary of anchor pins 20, a brake support or backing plate 22 which encloses the elements of the brake. Except as otherwise indicated in the description to follow, the aforementioned parts may be of any desirable construction and I may for example substitute a full wrapping two-shoe type of brake as shown in Fig. 3 in lieu of that disclosed in Fig. 1 the same reference numerals being used for the parts showing my invention.

My invention resides particularly in the means for spreading the brake shoes 14 and 16 or equivalent friction elements into drum contact and, as disclosed in Figure 1, there is provided a fluid power motor indicated generally by the numeral 24 and which motor is preferably fixedly secured by brackets 26 to the inside of the backing plate. The cylinder 24 receives the cylindrical cup-shaped piston 28 which is preferably provided with a cylindrical boss 30 on its inner face, which boss is slotted to receive a relatively narrow and round-ended shank of a connecting rod pivotally secured thereto. The connecting rod 31 is preferably cylindrical in section intermediate its length and may be provided with a flange 34 slightly spaced from the boss 30.

At its end the connecting rod is flattened and pivoted to the center of a triangularly-shaped equalizer bar 38, the latter having pivoted at its ends compression links 40. The links 40 which extend substantially parallel to each other are preferably pivoted at their outer ends to the slotted ends of the wedge-shaped links or cams 42, the latter sliding within grooves in the ends of the cam follower or thrust plates 44 secured to the ends of the friction elements. The wedge-shaped cams are also slidably received in slots or grooves in the sides of a rectangularly shaped guide member 46 which is rigidly secured to the backing plate. Suitable return springs 48 may be secured to the brackets 26, inclined upwardly, and secured to the webs of the brake shoes or other friction elements.

In operation, fluid under pressure admitted to the cylinder through a port 50, functions to thrust the piston radially of the drum, the connecting rod of which moves the equalizer bar upwardly to transmit forces to the compression links 40 resulting in equal horizontal thrust components from the cam wedge members to force the shoes with equal pressures into drum engagement. The guide member 46 serves to insure unvarying lateral components of force to the shoes and the play between the flange 34 and boss 30 on the piston obviates too great an equalizing action, that is, too great an applying force to one or the other of the cam wedges, the boss acting as a stop to limit the angular movement of the connecting rod. The shoulder on the equalizer bar 38 also functions as a stop to limit the rocking movement of the equalizer bar. Suitable steady rests 47 and guide pins are secured to the brake support plate co-operating with the webs of the shoes to constrain their lateral movement in a defined path. A suitable return spring 49 is also interposed between the periphery of the piston 28 and an end plate, which spring serves to return the piston upon release of the pressure on the fluid.

I have thus provided a compact fluid type of operator which transmits through the radial lineal movement of its piston or plunger equalized forces to each of the two separate cam members which apply with equal forces the friction elements of the brake.

Figure 2:
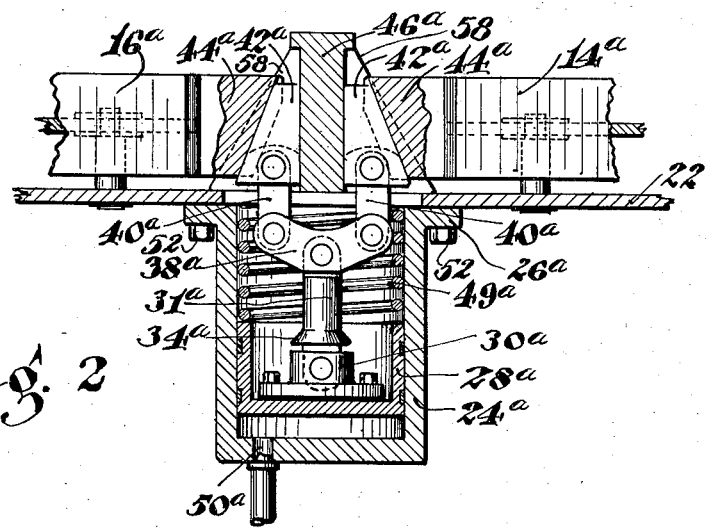
Figure 2 is a transverse section through the same type of operator disclosed in Figure 1, the same, however, being secured without instead of within the brake support.

In Figure 2, I have shown my novel operator adapted for mounting outside the backing plate, similar parts being designated by like reference numerals with the suffix "a" added to the numerals. The cylinder of the motor is bolted to the backing plate, as indicated at 52. With this position of the fluid motor, the connecting rod moves in a horizontal plane to apply the wedge cams horizontally to effect the desired separation of the brake shoes. The cam follower plates 44a with this modification of my invention are slotted transversely of the plates rather than longitudinally, as disclosed in Figure 1. The cam guide 46a is also provided with wings 58 providing laterally extending guides or slots to determine the path of movement of the wedge blocks.

While two illustrative embodiments of my invention have been described in detail, it is not my intention to limit the scope of the invention to those particular embodiments or otherwise than by the terms of the appended claims.

I claim:

1. A brake comprising in combination, a rotatable drum, a pair of friction elements positioned within said drum each having one end pivotally anchored adjacent to the other and having the opposite ends separate but juxtaposed, a pair of cam elements associated with said last named ends of the friction elements and means for moving said elements to apply parts of the brake, said means comprising a fluid power motor and means connecting said cams to said motor to effect equal pressures to said cams.

2. A brake comprising, in combination, a rotatable drum, friction elements within the drum adapted to be expanded into drum contact, two oppositely disposed radially movable cam members, and means including a fluid power motor for translating said cam members radially of the drum, to apply the friction elements of the brake with equal forces.

3. A brake comprising, in combination, a rotatable drum, anchor pins positioned adjacent to each other, a pair of substantially semi-circular friction elements each having one end pivotally mounted within said drum on one of said anchor pins respectively, and juxtaposed cam elements interposed between said friction elements at the ends opposite to said anchor pins, and means for moving said elements to apply parts of the brake, said means comprising a fluid power motor and means connecting said cams to said motor to effect equal pressures to said cams, said last-mentioned means comprising an equalizer bar having thrust links pivotally connected to its ends and to the cams.

4. A brake comprising, in combination, a rotatable drum, friction means within the drum having separable ends, means for separating said ends to apply the friction means comprising fluid pressure means in said drum, a pair of floating cam members radially movable by said fluid pressure means and means for transmitting balanced forces to the ends of said friction means, comprising a connection between said fluid pressure means and said cams.

5. A brake comprising, in combination, a rotatable drum, friction means within the drum having separable ends, means for separating said ends to apply the friction means comprising a pair of floating cams radially movable by fluid pressure means, and means for translating said cams radially to transmit balanced forces to the ends of said friction means, said means for translating comprising a fluid pressure motor and connections between the motor and the cams formed by an equalizer bar member pivoted at its ends to the parts of the cams.

6. A brake applying means comprising a pair of floating cams, a fluid power motor, and means comprising connections between said fluid power motor and said cams for transmitting equal forces to said cams.

7. A brake applying means comprising a two-part floating applying means, a fluid power motor, and means for transmitting equal forces to said applying means comprising connections between said fluid motor and said applying means, together with means constraining the path of movement of the parts of the applying means.

8. A brake comprising, in combination, a rotatable drum, friction means within the drum having separated ends positioned adjacent to each other, a stationary element positioned between said ends, and a pair of sliding wedge members interposed between said stationary element and the respective ends of said friction means.

9. A brake comprising, in combination, a rotatable drum, friction means within the drum having separated ends positioned adjacent to each other, a stationary element positioned between said ends, a pair of sliding wedge members interposed between said stationary element and the respective ends of said friction means, and means for transmitting balanced forces to said sliding wedge members.

10. A brake comprising, in combination, a rotatable drum, friction means within the drum having separated ends positioned adjacent to each other, a stationary element positioned between said ends, a pair of sliding wedge members interposed between said stationary element and the respective ends of said friction means, an equalizer bar pivotally connected to said sliding wedge members, and power means pivotally connected to said equalizer bar.

11. A brake comprising, in combination, a rotatable drum, friction means within the drum having separated ends positioned adjacent to each other, a stationary element positioned between said ends, a pair of sliding wedge members interposed between said stationary element and the respective ends of said friction means, and means comprising a fluid power motor and connections between said motor and said wedge members for applying balanced forces to said wedge members.

EUGENE V. TAYLOR.